E. L. ORCUTT, DEC'D.
E. N. HUTCHINS & E. E. EAMES, ADMINISTRATORS.
AUTOMATIC ELECTRICALLY ACTUATED TRAIN CONTROL SYSTEM.
APPLICATION FILED OCT. 11, 1916.
1,285,345.
Patented Nov. 19, 1918
7 SHEETS—SHEET 3.
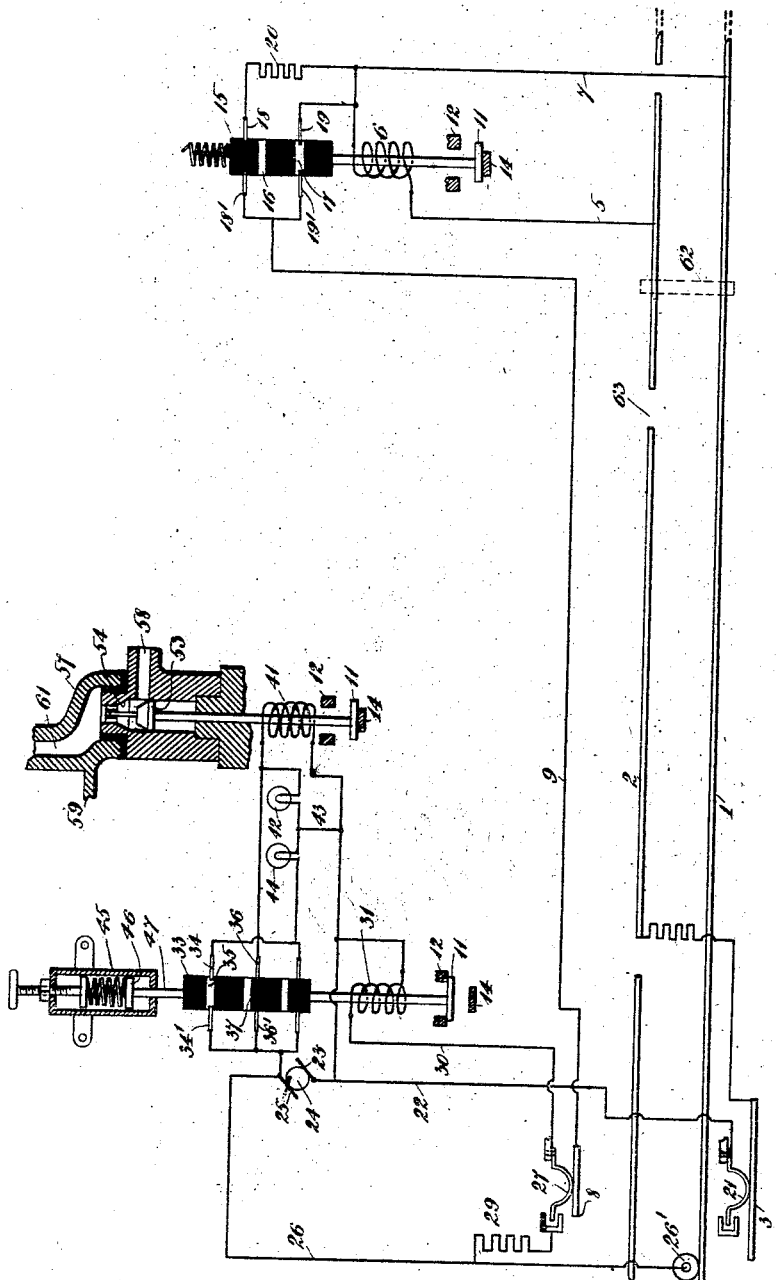

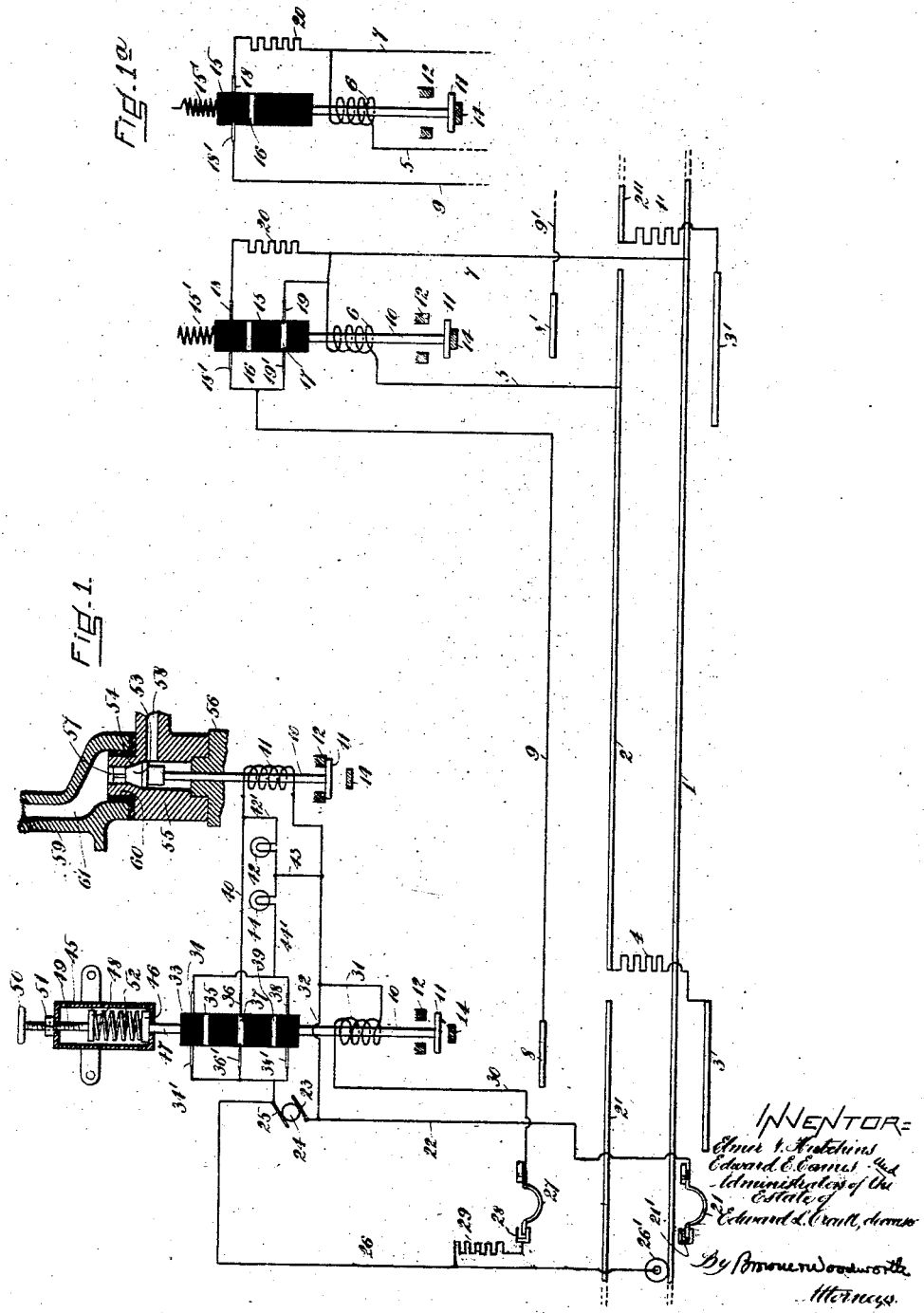

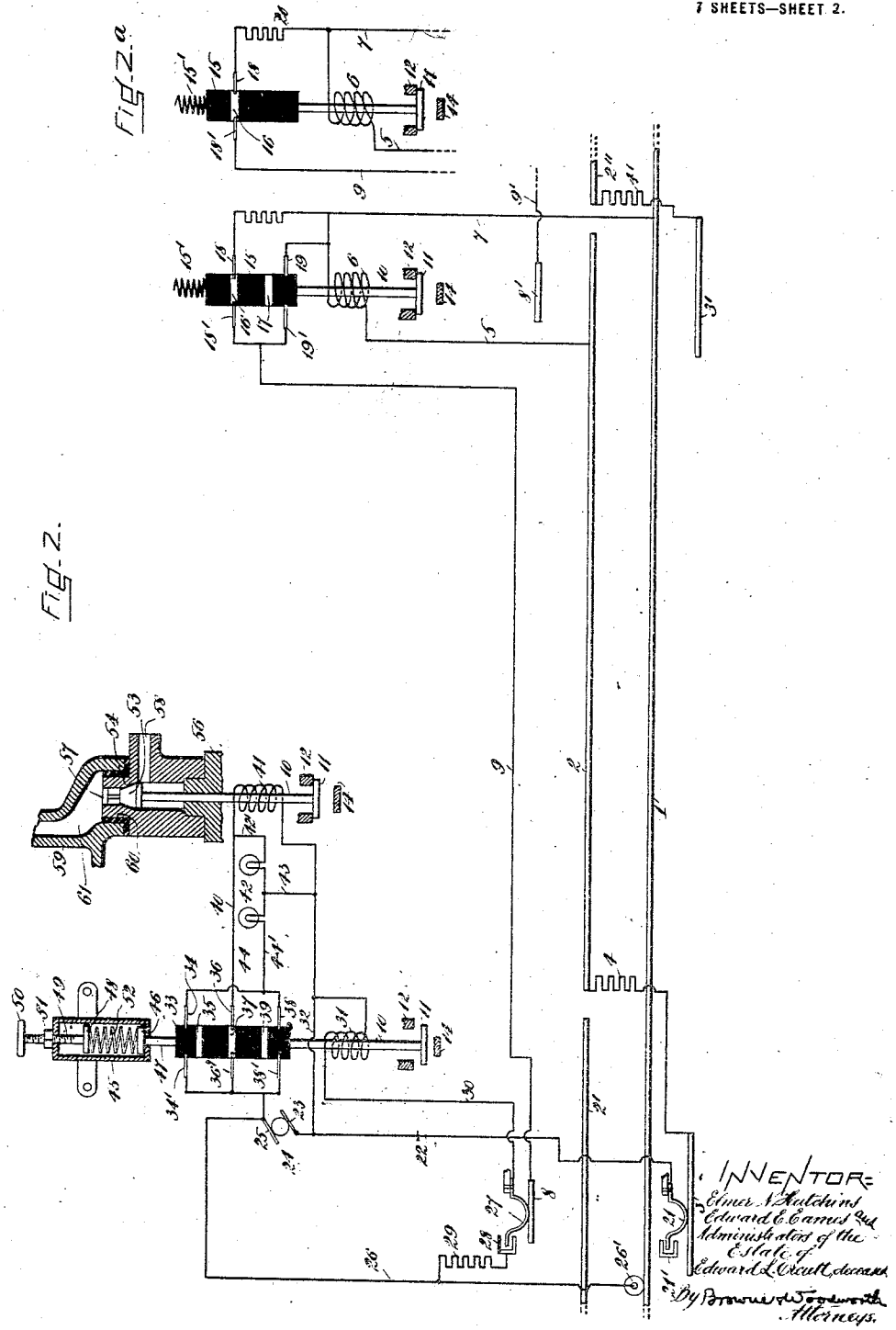

E. L. ORCUTT, DEC'D.
E. N. HUTCHINS & E. E. EAMES, ADMINISTRATORS.
AUTOMATIC ELECTRICALLY ACTUATED TRAIN CONTROL SYSTEM.
APPLICATION FILED OCT. 11, 1916.
1,285,345.
Patented Nov. 19, 1918.
7 SHEETS—SHEET 4.
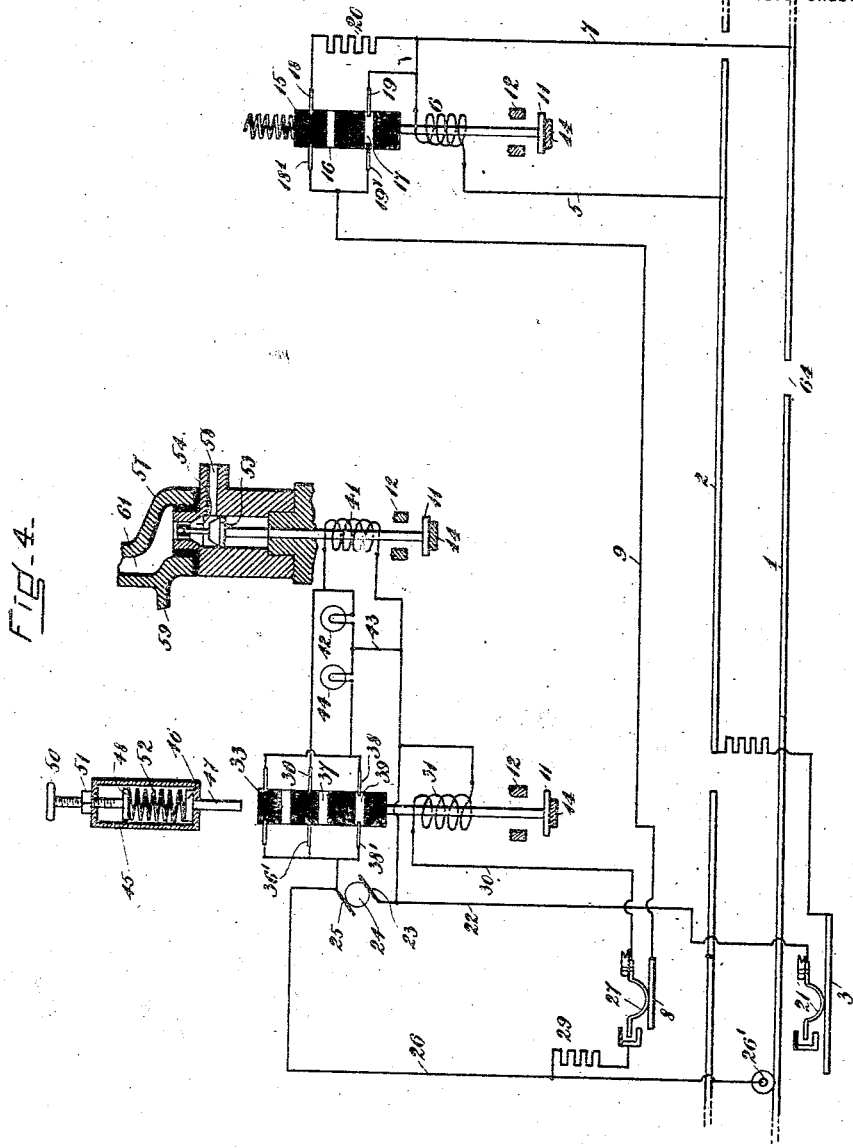
INVENTOR=
Elmer N Hutchins
Edward E Eames and
Administrators of the Estate of
Edward L. Orcutt, deceased.
By Browne и Woodworth,
Attorneys.

E. L. ORCUTT, DEC'D.
E. N. HUTCHINS & E. E. EAMES, ADMINISTRATORS.
AUTOMATIC ELECTRICALLY ACTUATED TRAIN CONTROL SYSTEM.
APPLICATION FILED OCT. 11, 1916.
1,285,345.
Patented Nov. 19, 1918.
7 SHEETS—SHEET 5.
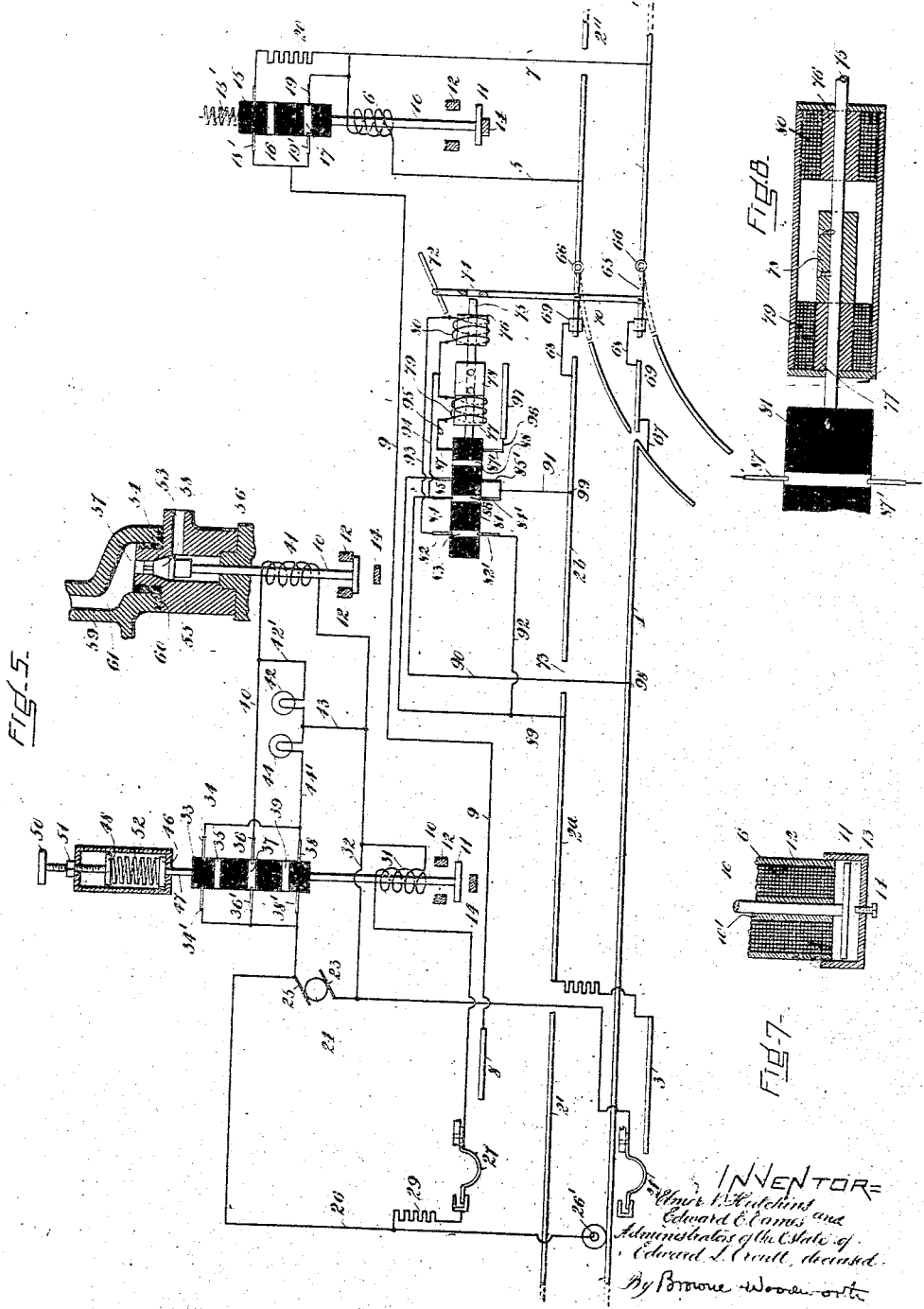

E. L. ORCUTT, DEC'D.
E. N. HUTCHINS & E. E. EAMES, ADMINISTRATORS.
AUTOMATIC ELECTRICALLY ACTUATED TRAIN CONTROL SYSTEM.
APPLICATION FILED OCT. 11, 1916.
1,285,345.
Patented Nov. 19, 1918.
7 SHEETS—SHEET 6.
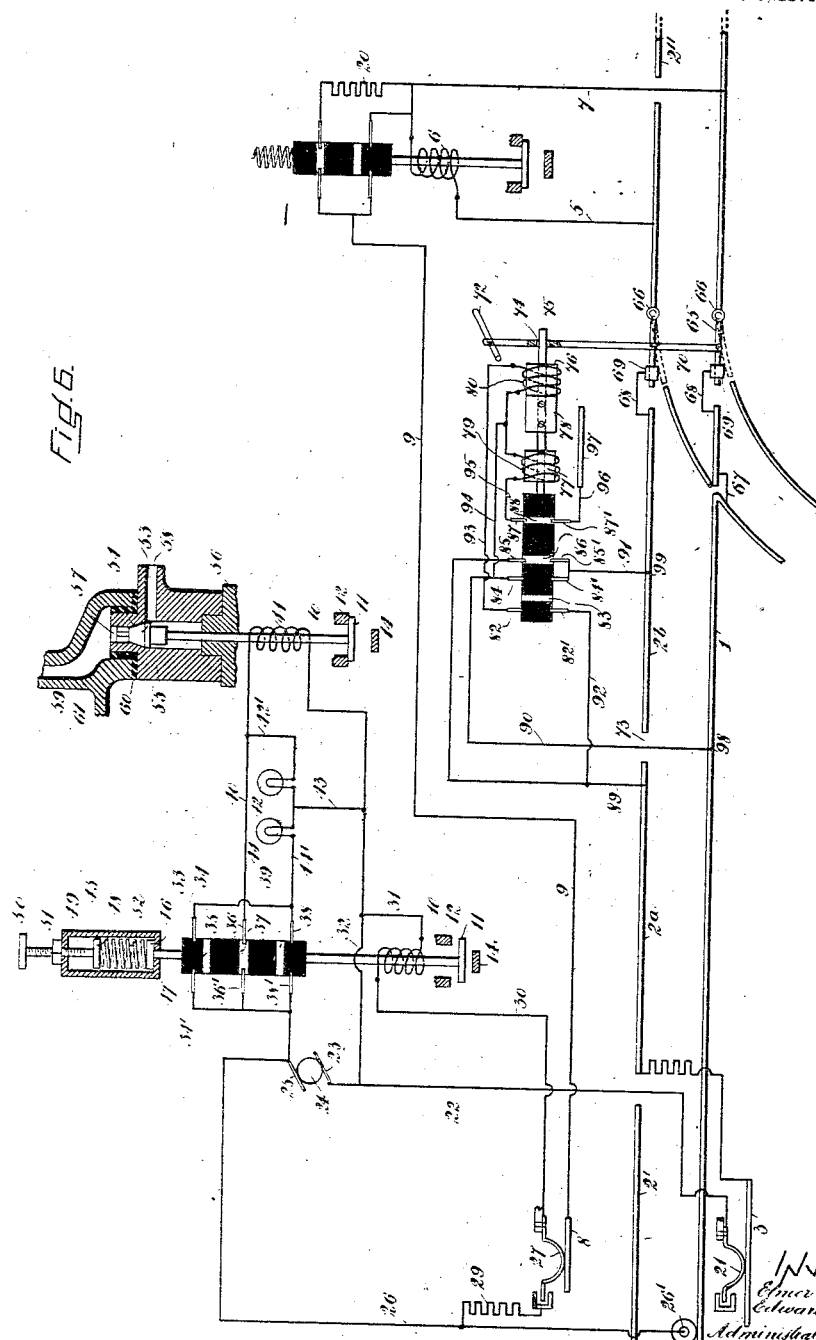

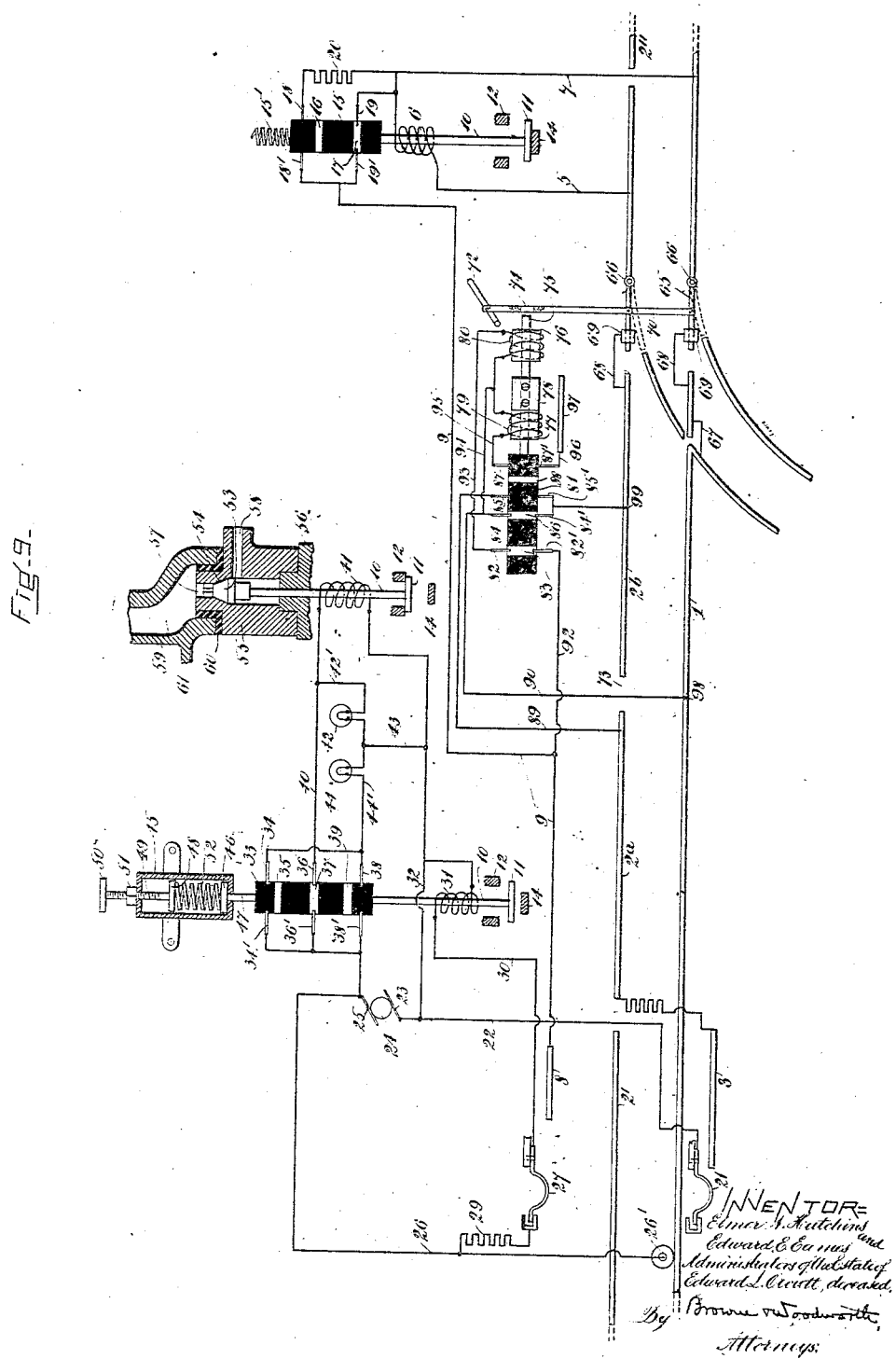

UNITED STATES PATENT OFFICE.

EDWARD L. ORCUTT, DECEASED, LATE OF SOMERVILLE, MASSACHUSETTS, BY ELMER N. HUTCHINS AND EDWARD E. EAMES, ADMINISTRATORS, OF SOMERVILLE AND WORCESTER, MASSACHUSETTS, RESPECTIVELY, ASSIGNORS TO ORCUTT AUTOMATIC TRAIN CONTROL COMPANY, OF WORCESTER, MASSACHUSETTS, A CORPORATION OF ARIZONA.

AUTOMATIC ELECTRICALLY-ACTUATED TRAIN-CONTROL SYSTEM.

1,285,345.        Specification of Letters Patent.    Patented Nov. 19, 1918.

Application filed October 11, 1916. Serial No. 125,110.

*To all whom it may concern:*

Be it known that EDWARD L. ORCUTT, late a citizen of the United States, and a resident of Somerville, in the county of Middlesex and Commonwealth of Massachusetts, deceased, invented a new and useful Improvement in Automatic Electrically-Actuated Train-Control Systems, of which the following is a specification.

This invention relates to systems for preventing railroad accidents, such as collisions, derailments, running on to open switches, etc., by means of electrical apparatus and circuits carried by the train and arranged to coöperate through ramps or contact plates located in the block-section in which the train is running with apparatus and circuits connected to and associated with the next block ahead.

The general object of the invention is to provide means whereby a train may automatically be brought to a stand-still in a given block when the next block ahead has been rendered unsafe from any cause, such for example as a broken rail, an open switch, or the presence of another train therein; to stop the train in a given block when any road bed circuit of the block ahead is opened or the road bed apparatus of such block short-circuited or otherwise disorganized; and to stop the train whenever any train circuit is opened or the train apparatus short-circuited or rendered incapable of performing its intended function.

A particular object of the invention is to provide means whereby a normally energized air-brake-controlling electro-magnet carried by the train is deënergized when the block in advance of that in which the train is running has been rendered unsafe or when any train or road bed circuit or apparatus is for any reason rendered inoperative, and by such deënergization causes the application of the air-brakes.

Another object is to provide means whereby the magnetic attraction of a normally energized train-carried electro-magnet is counterbalanced by the pressure of a spring so as to maintain the circuit of the air-brake-controlling magnet normally closed, and whereby upon either the deënergization or the over-energization of said electro-magnet the circuit of said air-brake-controlling magnet is opened and the circuits of certain signal indicating devices commutated so that the signal indication will be altered.

A further object of the invention is to provide means whereby a switch in the block ahead of that in which the train is running may be locked in closed position by the coöperation of said train and road bed circuits and subsequently unlocked when the train approaches quite close to the same or immediately after it passes said switch.

To these and other ends tending to improve and simplify systems of this general type and increase the efficiency of the same, the invention contemplates the use of two closed train circuits connected in parallel to a suitable source of electrical energy, the one by a magnetically controlled commutator governing the other, and the latter in turn governing the air-brakes or other train-stopping mechanism, together with means whereby one of said circuits may be momentarily broken at a given point in every block and then instantly closed by being looped into one of the road bed circuits connected to the block ahead, so that the condition of said two closed circuits will be altered or not according to the condition of the block in advance of that in which the train is running.

The invention also comprises an electro-magnetically controlled commutator at the end of every block whereby the current intensity in the above mentioned circuit formed by looping a train circuit into a road bed circuit may be varied or not according to the condition of the next block ahead of that in which the train is running, and the positions of the train apparatus correspondingly modified, said commutator being controlled by the coöperation of a third train circuit with a road bed circuit when the train is in the block preceding that to which said commutator is connected.

The invention further comprises an electro-magnetically controlled switch locking and unlocking mechanism and a commutator for varying the circuits thereof, said mechanism being controlled by the coöperation of the train and road bed circuits at a point in the block preceding that in which the switch is located.

Various other features of novelty will hereinafter be described and particularly set forth in the appended claims.

The drawings which accompany and form a part of this specification diagrammatically represent several embodiments of the invention; but it will be understood that both the apparatus and circuit arrangements therein conventionally shown may be materially modified by those skilled in the art without departing from the invention as defined by the appended claims.

In the drawings—

Figure 1 shows an automatic electrically actuated train controlling system embodying the present invention, the several moving parts of the train and track apparatus being represented in the positions which they occupy before the train circuits are in coöperation with the road bed circuits. Fig. 1ª shows a modification of the track commutator. Fig. 2 shows the positions occupied by said moving parts during the coöperation of the train and road bed circuits when the block ahead of the train is safe. Fig. 2ª shows the position of the modified track commutator when the block ahead of the train is safe. Fig. 3 shows the positions assumed by said moving parts when the block ahead of the train has been made unsafe by being short-circuited by another train or metallic obstruction, or by the breaking of one of the members of the sectional rail. Fig. 4 shows the position of said moving parts when said block has been rendered unsafe by the breaking of the continuous rail. Fig. 5 is a diagram showing the system of Fig. 1 provided with switch locking and unlocking apparatus, the moving parts being shown in the positions which they occupy before the coöperation of the train and road bed circuits. Fig. 6 shows the positions of said moving parts after the coöperation of the train and road bed circuits when the block ahead of the train is safe, the switch locking apparatus being shown in locking position. Fig. 7 is a fragmentary sectional view representing the preferred construction of certain electro-magnets employed in the present system. Fig. 8 is a sectional view representing the construction of the electro-magnet employed for actuating the switch locking mechanism. Fig. 9 is a diagram showing a modification of the system represented in Fig. 5.

Each of the figures represents a block section consisting of a rail 1, the joints of which are bonded to insure electrical continuity and a rail 2, the component parts of which are also electrically bonded, but the sections of which are insulated from the contiguous sections 2′, 2″, the electrically continuous portion of each section 2, 2′, 2″, etc., being co-extensive with the length of the block section. The rails 1 and 2 will hereafter be referred to as the "continuous rail" and the "sectional rail" respectively. Located between the ends of each sectional rail and preferably at a point some distance from the forward end of the same is a ramp or contact plate or rail 3 arranged parallel to the rails 1 and 2 and adjacent to one or the other so that a shoe carried by the train can make electrical contact with the same. For convenience of illustration the ramp 3 is shown at the end of section 2′ and adjacent to the outer side of rail 1, but it will be understood of course that said ramp may be placed adjacent to the outer side of the rail 2′ or may be located between the rails. The ramp 3 by means of a conductor, which may include the resistance 4, the sectional rail 2 and the conductor 5 is connected to one terminal of the track magnet 6, the other terminal of which is connected to the continuous rail by the conductor 7.

Arranged parallel to the ramp 3 is a somewhat shorter ramp 8 so arranged that its coöperating shoe does not strike the same until after the other shoe has made contact with ramp 3 and having its forward end in the rear of that of ramp 3 so that its shoe will leave the same before the other shoe breaks contact with ramp 3. By means of a conductor 9 preferably carried by the telegraph poles beside the track the ramp 8 is connected by way of the track commutator hereinafter described to the continuous rail.

The magnet 6 preferably is of the plunger type and as shown in Fig. 7 its armature 11 will be attracted to the lower end of the sheath 12 surrounding the coil and to the lower end of the hollow core 10′ in which the plunger 10 has a sliding fit, the sheath being provided with a cap 13 having an adjustable stop 14 to limit the lowermost position of said armature. The details of such an electro-magnet are shown in Patent No. 1,114,642, dated October 20, 1914, and need not be further specified herein. The plunger 10 carries a commutator 15 herein called the "track commutator" and comprising in the form shown in Fig. 1 two conducting rings 16, 17 with which two pairs of brushes 18, 18′, and 19, 19′, respectively, are arranged to coöperate. A resistance 20 is connected between the brush 18 and the conductor 7 which is directly connected to brush 19, so that the ramp 8 by means of said conductor 9 is connected directly with the continuous rail through the brushes 19, 19′ and the ring 17, and is connected thereto through the resistance 20 by means of the brushes 18, 18′ and the ring 16 according to the position of the commutator.

In the form shown in Fig. 1ª the ring 17 and its adjacent brushes are omitted so that when the brushes 18, 18' make contact with the ring 16, the ramp 8 is as before connected with the rail 1, but when said brushes are out of contact with said ring the circuit between said ramp and the continuous rail is opened.

At the end of the block 2 ramps 3', 8' are represented, the former being connected through resistance 4' to the sectional rail 2" and the latter being connected by the wire 9' to apparatus identical with that to which conductor 9 is connected, and it will be understood without further explanation or illustration that every block is provided with a pair of ramps such as shown at 3, 8, connected to the next block ahead and to apparatus associated with the far end of such block identical with that shown in Fig. 1.

It will also be understood that the present invention is not limited to electro-magnets of the type shown in Fig. 7 or to a track commutator of the type above described and that throughout the specification and claims the term "commutator" unless more particularly specified is employed to designate an apparatus whereby circuit connections may be changed. While a solenoid type of magnet actuating a commutator of the kind shown is preferred, it is possible to use a commutator of the relay type having a pivoted armature such as shown in Patent No. 1,137,660, dated April 27, 1915. The commutator and its magnet are located preferably on a telegraph pole beside the track.

For convenience of identification the ramp 3 will be hereinafter referred to as the "track-magnet ramp" and the ramp 8 as the "track-commutator ramp". Carried by the train and preferably by the pony truck of the locomotive is a contact shoe 21 of any suitable construction and herein shown as a downwardly curved member of spring material fixed at one end and resting on the stop 21' at the other, the curved portion of said shoe being arranged to ride up upon the ramp 3 and make electrical contact therewith. The shoe 21 hereinafter designated as the "track-magnet ramp-shoe" is connected by wire 22 to one pole 23 of the source of electrical energy 24, herein shown as a dynamo electric machine preferably operated by a steam turbine as described in said Patent No. 1,137,660. The other pole 25 of said source is connected to the continuous rail 1 by the conductor 26 and the contact member 26' which as shown may be one of the locomotive wheels.

The shoe 27 similar in construction to shoe 21 and hereinafter referred to as the "track-commutator ramp-shoe" is also fixed to the train and preferably to the pony truck of the engine and arranged to make contact with the track commutator ramp. The free end of the shoe 27 rests against the stop 28 which is connected by the resistance 29 and the conductor 26 to the pole 25 of the generator. The resistance 29 is substantially equivalent to resistance 20 so that when the shoe 27 is in engagement with the ramp 8 and the resistance 29 thereby cut out of the circuit formed by the coöperation of said shoe and ramp and by the coöperation of contact member 26' and continuous rail, the resistance 20 by its substitution will be effective in preventing any material change in the current intensity of said circuit. The fixed end of the shoe 27 is connected by wire 30 to the cab or control magnet 31 and the other terminal of the latter is joined to the pole 23 of the generator by conductor 32, so that normally there is a closed circuit through the resistance 29 and the cab magnet, the resulting normal energization of the latter maintaining the cab commutator 33 in the position shown in Fig. 1. The commutator 33 is provided with three pairs of brushes 34, 34' arranged to coöperate with the ring 35, 36, 36' arranged to coöperate with the ring 37, and 38, 38' arranged to coöperate with the ring 39. The brush 36 is connected by conductor 40 to the air-brake-controlling or train-stopping magnet 41, the other terminal of which is connected by wire 32 to pole 23 of the generator. The brushes 34', 36', 38' are connected to the pole 25 of the generator so that when the apparatus is in normal condition there will be a closed circuit from the generator through the air-brake-controlling magnet by way of ring 37 and its coöperating brushes. A safety signal indicating device herein, shown as a lamp 42 is connected in parallel to the magnet 41 by the wires 42', 43. A danger signal indicating device 44 herein shown as a lamp is connected by wire 44' to the brushes 34, 38, which are joined together, and by the wires 43 and 32 to the brush 23 of the dynamo. It will be noted that when the apparatus is in normal condition there will be a flow of current through the signal device 42 by way of the ring 37 and its coöperating brushes, and that the other two pairs of brushes are normally in contact with the insulation portions of the commutator so that the danger signal device 44 is not actuated.

Means must be employed for counterbalancing the normal magnetic attraction of the armature of the cab magnet so that the ring 37 may be maintained in coöperation with the brushes 36, 36' and while various devices may be employed for this purpose it is preferred to use the arrangement shown herein for thereby oscillation of the commutator 33 due to the vibration of the moving train is practically eliminated. This arrangement comprises a cylinder 45 inclosing a piston 46 having a stem 47 which projects through an aperture in the bottom of the cylinder and is arranged to bear against the top of the commutator when the latter is in normal position. The piston 48 has a stem 49 threaded to and projecting through the top of the cylinder, said stem being provided with a knurled head 50 for turning the same and a lock nut 51 for securing it in adjusted position. Interposed between the adjustable piston and the sliding piston 46 is a coiled spring 52, a pressure of which on the lower piston and hence on the commutator may be adjusted by turning the head 50 to counterbalance the magnetic attraction of the magnet 31 so as to maintain the commutator 33 substantially stationary during the normal energization of said magnet. When the magnet 31 is over-energized the spring 52 will be further compressed by the action of the commutator and sliding piston thereon as shown in Fig. 3, and when said magnet is under-energized or deënergized the armature 11 will fall down to its back stop 14 and the commutator 33 will fall away from the stem 47 of the sliding piston as indicated in Fig. 4. When the commutator is maintained in equilibrium between the two opposing forces the sliding piston is not necessarily in contact with the bottom of the cylinder 45 as shown in Fig. 1.

The magnet above referred to as the air-brake-controlling magnet may be employed to control the operation of the air-brakes, the engine throttle, or the track sander, or any two or all three, and preferably as shown it is used to control the air-brake in the following manner: Secured to the plunger rod of said magnet is a valve 53 arranged to rest when said magnet is energized upon the seat 54 in the casing 55 which is mounted upon the back yoke 56 of said magnet and thereby close the port 57 which otherwise would communicate with the atmosphere by the passage 58. The casing 59 of the blanking valve (not shown) is mounted upon the valve casing 55, and insulated therefrom by means of the bushing 60. The casing 59 is provided with a passageway 61 which will be put into communication with the atmosphere when the valve 53 is off its seat and thereby effect the application of the air-brakes in the manner described in Patent No. 1,114,642 and in the improvement thereon disclosed in the application of Eldridge I. La Count, Serial No. 125,112, filed October 11, 1916.

The operation of the system above described is as follows: Before the shoes have made contact with their respective ramps the circuit of the magnet 6 is open, this circuit being hereinafter termed the "track-magnet circuit," viz., the circuit 5, 4, 2, 5, 6, 7, 1, 26', 26, 24, 22, 21, said magnet consequently deënergized, its armature 11 forced down on the back stop 14 by the spring 15' and the brushes 19, 19' in contact with the ring 17. The circuit of the magnet 31 is closed, this circuit being hereinafter termed the "control-magnet circuit," viz., the circuit 23, 32, 31, 30, 27, 28, 29, 26, 25, and the armature of said control-magnet is about midway between the back stop 14 and the lower ends of the sheath 12 as indicated so that the brushes 36, 36' make contact with ring 37. The circuit hereinafter termed the "track-commutator circuit," viz., the circuit 8, 9, 19', 17, 19, 7, 1, 26', 26, 24, 32, 31, 30, 27, is open and the resistance 20 is not serially connected therein. The circuit of the air-brake-controlling magnet 41, viz., the circuit 23, 32, 41, 40, 36, 37, 36', 25, is closed, and the valve 53 is on its seat. The safety signal device 42, being connected in parallel with the magnet 41 is energized. The danger signal device 44 having one terminal connected to the brushes 34, 38 which rest upon the insulation portions of the commutator 33 is deënergized.

As soon as the shoe 21 comes in contact with the track-magnet ramp 3 the track-magnet circuit is closed, the armature of the track-magnet drawn up to its front stop 12 and the ring 16 placed into coöperation with the brushes 18, 18', thereby cutting the resistance 20 into the track-commutator circuit, and the contact between ring 17 and brushes 19, 19' is broken, as shown in Fig. 2. Shortly afterward the shoe 27 makes contact with the track-commutator ramp 8 and thereby loops the control-magnet circuit into the track-commutator circuit, the shoe 27 breaking contact with its stop 28 and thereby cutting the resistance 29 out of circuit, said resistance being replaced by an equivalent resistance 20. In other words the track-commutator circuit is closed between the shoe 27 and its ramp and may now be traced as follows, viz., starting from brush 23 of the generator to conductor 32, control magnet 31, conductor 30, shoe 27, ramp 8, conductor 9, brush 18', ring 16, brush 18, resistance 20, conductor 7, continuous rail 1, contact member 26', and thence back to the other brush 25 of the generator by conductor 26. The momentary opening of the control-magnet circuit will not suffice to deënergize the control-magnet for practically simultaneously with such opening said circuit is closed in the manner above indicated so that the current intensity in the circuit of said magnet is not appreciably altered and the commutator and its associated apparatus maintain their normal positions, the magnet 41 and lamp 42 being energized as before and the lamp 44 being deënergized.

When the ring 17 and its associated brushes are omitted as shown in Figs. 1ª and 2ª, the track-commutator circuit is normally open at the commutator as well as at the ramp 8, but in such case the energization of the track-magnet will cut the resistance 20 into the circuit as indicated in Fig. 2ª so that upon the coöperation of the shoe 27 and ramp 8 the circuit may be traced in the same way as above outlined in connection with Fig. 2.

When the block ahead of that in which the train is running has been rendered unsafe the track-magnet will remain deënergized and the resulting changes in the positions of the moving members are indicated in Figs. 3 and 4.

When the track is short-circuited as by another train or metallic obstruction 62 the terminals of the track-magnet 6 are short-circuited and the armature of said magnet will consequently remain on its back stop. When the sectional rail 2 is broken as indicated at 63 the track-magnet circuit is opened and the armature of said magnet will remain on its back stop. Consequently the resistance 20 will not be cut into the track-commutator circuit and the conductor 9 will be directly connected to the continuous rail through the brushes 19, 19′ and ring 17. This results in materially increasing the strength of the current energizing the control-magnet so that being over-energized its armature 11 will be drawn up to its front stop 12, the magnetic attraction overcoming the tension of the spring 52, and the ring 37 will be moved away from the brushes 36, 36′, thereby opening the circuit of the air-brake-controlling magnet 41 and closing the circuit of the danger lamp 44 by way of the brushes 34, 34′ and ring 35. The deënergization of the magnet 41 places the passage 61 into communication with the atmosphere, in the particular embodiment of the invention shown herein, and thereby effects the application of the air-brakes in the manner more fully described in Patent No. 1,114,642. The air-brakes will remain set until the valve 53 is again brought up to its seat 54 or until the adjunct to the engineer's valve which is controlled by the magnet 41 is cut out in the manner described in the application of Eldridge I. La Count, above referred to. If the track trouble is remedied while the shoes are on their respective ramps, the valve 53 will be closed when the engineer operates a valve to cut off the air pressure from the passage 61 as described in the application of Eldridge I. La Count aforesaid, for in such case the magnet 6 will be energized as soon as the short-circuit is removed or the continuity of the sectional rail restored and the resistance 20 thereby cut into the track-commutator circuit whereupon the control magnet will assume the position shown in Figs. 1 and 2. If, however, the shoes have run over their respective ramps before the train has been stopped the resulting closure of the control-magnet circuit at 28 will restore the commutator 33 to normal position and thereby enable the magnet 41 to effect the closure of the valve 53 as soon as the air pressure above the latter has been relieved by the engineer.

If the continuous rail 1 is broken as indicated at 64 (Fig. 4) the circuit of the magnet 6 and that of the track-commutator circuit will both be opened so that although the wire 9 is in such case directly connected to the continuous rail and the resistance 20 cut out of circuit, the magnet 31 will be deënergized, its armature will fall down to its back stop, the circuit of magnet 41 will be opened between the brushes 36, 36′ and the circuit of the danger lamp 44 will be closed through the ring 39. In such case of course as in those preceding the train will be brought to a standstill. Should the track be short-circuited as shown at 62 or the rail 2 broken as shown at 63, with the result that the parts assume the positions shown in Fig. 3, the magnet 31 being over-energized, and then the conductor 9 or the conductor 7 or any other portion of the track-commutator circuit be broken, the magnet 31 would become deënergized and the parts would instantly assume the positions indicated in Fig. 4.

A short-circuit across the track-magnet or the track-commutator leads obviously would have the same effect as the short-circuiting of the track by another train or otherwise so that in both cases the resistance 20 would be cut out and the magnet 31 over-energized.

Obviously any mishap to the train circuits would result in stopping the train. For example if the circuit of the air-brake-controlling magnet should be opened or the magnet itself short-circuited, the resulting deënergization of said magnet would cause the valve 53 to leave its seat, and similarly the opening of the control-magnet or the short-circuiting of the same would result in breaking the circuit of the magnet 41. Should the conductor 22 which connects the generator to the shoe 21 be broken the track-magnet circuit would not be closed by the coöperation of said shoe with its ramp and the control-magnet would be over-energized as soon as the track-commutator ramp-shoe made contact with its ramp 8. Should the conductor 26 which connects the generator with the contact member 26′ be broken, the track-commutator circuit would not be closed when the track-commutator ramp-shoe coöperated with its ramp 8, and the control-magnet in such case would be deënergized.

It will be noted that the circuits whereby the magnets 31, 41 are energized do not include the lamps 42, 44 in series so that these lamps, which are not entirely essential to the system, might be destroyed and the circuit therethrough broken without effecting the operations above set forth.

Where the modified form of track-commutator shown in Figs. 1ᵃ and 2ᵃ is employed, it will be obvious that anything that prevents the energization of the track-magnet will prevent the closure of the track-commutator circuit through the ring 16 and that therefore the short-circuit of the track or the breaking of either rail will result in the deënergization of the control-magnet 31 so that the cab-commutator 33 will take the position shown in Fig. 4 with the result already set forth.

The track-magnet ramp 3 should be about sixty feet in length and its coöperating shoe should strike the same long enough before shoe 27 makes contact with ramp 8 to permit the energization of the track-magnet and the setting of the track-commutator to the position shown in Fig. 2. Obviously the shoe 27 must break contact with its ramp before the track-magnet circuit has been opened by the breaking of the contact between shoe 21 and ramp 3.

The system above described may be provided with apparatus whereby the coöperation of the train circuits with the road bed circuits will lock a switch in the block ahead of that in which the train is running and unlock the same shortly before or immediately after the train passes such switch.

An apparatus and its associated circuits for accomplishing this result is shown in Figs. 5, 6 and 9. The switch herein represented as a stub-switch is shown at 65, the switch rails being pivoted at 66, 66, and the wire 67 is employed to indicate the maintenance of the electrical continuity of the rail 1, such continuity in practice being maintained by the frog while bonds 68, 68 indicate the electrical connection between the proximate ends of the track rails and the switch rails, the free ends of the latter sliding over the plates 69 in the present instance and being connected by tie rods, one of which is shown at 70. The switch rod 71 is operated by the switch lever 72 to open and close the switch, the open position of the same being indicated in dotted lines. When a stub-switch of this character is opened the metallic contact between the switch plates 69, the track rails and the free ends of the switch is broken but it will be understood that the particular showing is made merely for the purpose of convenience and that in actual practice switches of such character are employed that when opened such metallic contact is not broken, so that the mere opening of such a switch would not prevent the energization of the track-magnet 6.

The sectional rail 2 in Figs. 5, 6 and 9 consists of two portions, 2ᵃ and 2ᵇ insulated from each other as indicated at 73. The switch rod is provided with an aperture 74 for receiving the end of the plunger 75 of a solenoid magnet to lock the switch in closed position. The details of one form of solenoid magnet are shown in Fig. 8 and consist of stationary armatures 76, 77 in the central bores of which the plunger has a sliding fit. Secured to the plunger is a shuttle 78 of magnetic material arranged to be attracted to whichever armature may be magnetized by the solenoids 79, 80. Preferably a metallic sheath surrounds the magnets. Carried by the plunger 75 is a commutator 81 hereinafter referred to as the "switch commutator" associated with which are the brushes 82, 82' arranged to make contact with the ring 83, the brushes 84, 84' and 85, 85' arranged to make contact with the ring 86 and the brushes 87, 87' arranged to make contact with the ring 88.

A conductor 89 connects the section 2ᵃ with the brush 85 and a conductor 90 is connected between the brush 84 and the continuous rail 1. The brushes 84', 85' are joined together and connected by wire 91 to the section 2ᵇ. The track-magnet ramp is electrically connected with the brush 82', by means of the wire 92 and the portion of the wire 89. The outer terminal of the winding 80 is connected by wire 93 to brush 82 and the inner ends of both windings are connected by wire 94 to the brush 84. The brush 87 is connected by wire 95 with the outer end of the winding 79. The wire 96 connects the brush 87' with the ramp 97 hereinafter referred to as the "switch-commutator ramp" which is arranged in line with the ramp 8 for coöperation with the shoe 27 and which as shown may be placed a short distance in the rear of the switch if the latter is to be unlocked before the train passes the same, or ahead of the switch if it is desired to unlock the same after the train has passed it.

Fig. 5 shows the positions of the several moving parts of the system before the shoes have made contact with their respective ramps and consequently the switch is unlocked. Fig. 6 shows the position of these parts after the shoes have made contact with their ramps and when the block ahead of the train is safe, the switch being in such case locked closed by the plunger 75 the end of which is shown as projecting through the aperture 74 in the switch rod.

As soon as the shoe 21 strikes the ramp 3 there will be a circuit through the locking magnet 80 as follows, reference being had to Fig. 5: from the generator 24 to shoe 21, ramp 3, track section 2ᵃ, wires 89 and 92, brush 82', ring 83, brush 82, wire 93, solenoid 80, wires 94 and 90, and thence back to the other pole of the generator by way of the continuous rail, the contact member 26' and conductor 26. If the switch is closed as indicated in Fig. 5 the bolt 75 will be shot through the hole 74, and the switch commutator will take the position shown in Fig. 6.

The other circuits may now be traced as follows, reference being had to Fig. 6: from the generator to shoe 21, ramp 3, section 2ᵃ, conductor 89, brush 85, ring 86, brush 85′, section 2ᵇ, thence through track-magnet 6 by conductor 5 and back to the other terminal of the generator by wire 7 and continuous rail. The track-magnet 6 will be energized as indicated in Fig. 6, the resistance 20 will be cut into the track-commutator circuit and the latter may be traced as above pointed out in connection with Fig. 2.

If however the opening of the switch will break the continuity of the rails as indicated in Figs. 5 and 6, the track-magnet 6 will not be energized when the shoe 21 strikes its ramp and the train will be brought to a standstill in the manner pointed out in connection with Fig. 4, the control-magnet 31 in such case being deënergized.

However, in the more practical case where one of the more usual forms of switches is employed the train will be stopped in the block behind an open switch in the following manner: If the switch is open the aperture 74 of the switch rod will be out of alinement with the bolt 75 and consequently the energization of the solenoid 80 will not shift the commutator from the position shown in Fig. 5 to that of Fig. 6. Consequently (reference being had to Fig. 5) the circuit of the track-magnet 6 will be broken between the brush 85 and one of the insulation portions of the commutator so that the wire 9 will be directly connected to conductor 7 by way of the brush 19′, ring 17 and brush 19, and the control-magnet 31 consequently overenergized, with the result set forth in connection with Fig. 3.

If the block is safe and the train passes on to the same, the coöperation of the shoe 27 with the switch-commutator ramp 97 will unlock the switch and cause the parts to assume the positions shown in Fig. 5, as follows, reference being had to Fig. 6: Current will pass from the generator 24 by way of the control-magnet 31 and conductor 30 to shoe 27 and ramp 97, thence to brush 87′, ring 88, brush 87, solenoid 79, conductor 94, and thence back to the generator by wire 90 and the continuous rail.

In order to prevent the energization of the track-magnet 6 when the switch is open by the completion of the circuit of said magnet through earth connections or grounds the brushes 84, 84′ are employed. For example, should the switch be open and the bolt 75 thereby prevented from passing through the hole 74 in the manner above pointed out, an earth connection between sections 2ᵃ and 2ᵇ or between section 2ᵇ and the ramp 3 would complete the circuit through the track-magnet when both shoes were in contact with their respective ramps 3 and 8. However by means of the conductors 90 and 91 which are connected respectively to the brushes 84 and 84′ and to the rails at 98, 99, a short-circuit or path of negligible resistance is connected across the terminals of the track-magnet so that the bridging of the gap 73 or an earth connection between the ramp 3 and section 2ᵇ would result in a flow of current from shoe 21, ramp 3, conductor 91, brush 84′, ring 86, brush 84, conductor 90, and thence back to the generator by contact member 26′, and the track-magnet would not be energized.

In the modification shown in Fig. 9 the brush 82′ is connected to the ramp 8 so that the energy which actuates the locking magnet 80 proceeds from the track-commutator circuit when the shoe 27 makes contact with said ramp in a manner that will be obvious. In this case, however, the control-magnet must be designed to be slightly sluggish and to have a larger time-constant than in the case where wire 92 is connected to the ramp 3, or else the track-magnet 6 must be designed to be more sensitive than in the latter case. The reason for this will be apparent when it is considered that the resistance 20 must be cut into the track-commutator circuit substantially simultaneously with the cutting out therefrom of the resistance 29, and that the resistance 20 will not be cut into said circuit until the switch is locked and the ring 86 brought into contact with brushes 85, 85′. It is however possible to so time the several magnets that the energization of the solenoid 80 by current from the conductors 9 and 92, brush 82′, ring 83, brush 82, and conductor 93 will be effected and the commutator 81 shifted to locking position (Fig. 6) thereby permitting current from the ramp 3, brush 85, ring 86, brush 85′ and section 2ᵇ to energize the track-magnet and cut the resistance 20 into the track-commutator circuit, before the opening of the control-magnet circuit at the contact 28 will result in the deënergization of said control-magnet.

Having thus particularly described several illustrative embodiments of the invention of the late Edward L. Orcutt without however limiting the same thereto, what we as the administrators of his estate claim and desire to secure by Letters Patent is:

1. In a train controlling system, the combination with an electrically-continuous rail and a sectional rail, each section of which is electrically-continuous but insulated from its contiguous sections, of a source of electrical energy carried by the train, a train-stopping magnet normally energized by said source, a control magnet connected in parallel with said train-stopping magnet, and means actuated by said control magnet for opening the circuit of said train-stopping magnet when said control magnet is either over-energized or under-energized.

2. In a train controlling system, the combination with an electrically-continuous rail and a section rail, each section of which is electrically-continuous but insulated from its contiguous sections, of a source of electrical energy carried by the train, an air-brake-controlling magnet normally energized by said source, a control magnet connected in parallel with said air-brake-controlling magnet, and means actuated by said control magnet for opening the circuit of said air-brake-controlling magnet when said control magnet is either over-energized or under-energized.

3. In a train controlling system, the combination with an electrically-continuous rail and a sectional rail, each section of which is electrically-continuous but insulated from its contiguous sections, of a source of electrical energy carried by the train, a train-stopping magnet normally energized by said source, a control magnet connected in parallel with said train-stopping magnet, and a commutator actuated by said control magnet for opening the circuit of said train-stopping magnet when said control magnet is either over-energized or under-energized.

4. In a train controlling system, the combination with an electrically-continuous rail and a sectional rail, each section of which is electrically-continuous but insulated from its contiguous sections, of a source of electrical energy carried by the train, a train-stopping magnet normally energized by said source, a control magnet connected in parallel with said train-stopping magnet, a commutator actuated by said control magnet for opening the circuit of said train-stopping magnet when said control magnet is either over-energized or under-energized, and means for counter-balancing the normal action of said control magnet on said commutator.

5. In a train controlling system, the combination with an electrically-continuous rail and a sectional rail, each section of which is electrically-continuous but insulated from its contiguous sections, of a track-commutator, a track magnet for operating said track-commutator, said track-magnet having its terminals connected respectively to said continuous rail and to one of said sections at a point near the end of the latter, a track-magnet ramp located between the ends of the preceding section, means electrically connecting said ramp to the section to which said track magnet is connected, a track-commutator ramp located a short distance ahead of said track-magnet ramp, means electrically-associating said track-commutator ramp with said track-commutator, train-carried contact members arranged to coöperate respectively with said ramps, a source of electrical energy carried by the train and having one pole connected to said continuous rail and the other to said contact members, said source being arranged to energize said track magnet when one of said contact members makes contact with said track-magnet ramp, a stop member for the other contact member, a resistance connecting said stop member to the pole of said source which is connected to said continuous rail, a control magnet connected between said resistance and the other pole of said source, a control-magnet commutator actuated by said control magnet, resilient means counter-balancing the normal action of said control magnet on said commutator, an air-brake-controlling magnet connected to said source, said control-magnet commutator being interposed between one terminal of said air-brake-controlling magnet and one pole of said source, and means associated with said track commutator for varying the current intensity in the circuit of said control magnet whereby said control-magnet commutator will open the circuit of said air-brake-controlling magnet when said control magnet is over-energized or under-energized.

6. In a train controlling system, the combination with an electrically-continuous rail and a sectional rail, each section of which is electrically-continuous but insulated from its contiguous sections, of a source of electrical energy carried by the train, a train-stopping magnet normally energized by said source, a control magnet connected in parallel with said train-stopping magnet, an insulation member actuated by said control magnet, and a conducting member carried by said insulation member, the terminals of the circuit of said train-stopping magnet normally being in contact with said conducting member.

7. In a train-controlling system, a track magnet arranged to be actuated by a source of electrical energy carried by the train, a track commutator operated by said track magnet, said commutator having insulating and conducting members, a circuit associated with said track commutator, and means associated with said track commutator for varying the resistance of said circuit according to the position of said commutator.

8. In a train-controlling system, a train-stopping magnet, a control magnet for the same, a danger-signal indicating device and a safety-signal indicating device, the circuits of both of said devices being associated with that of said train-stopping magnet, a commutator actuated by said control magnet, said commutator having two conducting members separated by insulation, two pairs of brushes arranged to coöperate pair by pair, respectively, with said conducting members, connections from one pair of brushes to said train-stopping magnet and one of said signal indicating devices and connections from the other pair of brushes to the other of said signal indicating devices.

9. In a train controlling system, a train-stopping magnet, a control magnet for the same, a danger-signal indicating device and a safety-signal indicating device, the circuits of both of said devices being associated with that of said train-stopping magnet, a commutator actuated by said control magnet, said commutator having three conducting members, three pairs of brushes arranged to coöperate pair by pair, respectively, with said conducting members, connections from one pair of brushes to said train-stopping magnet and one of said signal indicating devices and connections from the other pairs of brushes to the other of said signal indicating devices.

10. In a train controlling system, a track magnet arranged to be actuated by a source of electrical energy carried by the train, a track commutator operated by said track-magnet, said commutator having insulating and conducting members, a circuit associated with said track commutator, two brushes associated with said track commutator, and a resistance connected to one of said brushes whereby the current intensity of said circuit is varied according to the position of said commutator.

11. In a train controlling system, an electro-magnet, a commutator actuated thereby, a member bearing against the end of said commutator but not connected thereto, a spring arranged to exert pressure on said member, and means for arresting the movement of said member toward said commutator.

12. In a train controlling system, an electro-magnet, a commutator actuated thereby, a member bearing against the end of said commutator but not connected thereto, a spring arranged to exert pressure on said member, and means for regulating the degree of compression of said spring.

13. In a train controlling system, an electro-magnet, a commutator actuated thereby, a cylinder fixed above said commutator, a piston in said cylinder, a stem attached to said piston and projecting through the bottom of said cylinder, the end of said stem resting upon but not connected to the top of said commutator, and a spring acting by compression on said piston.

14. In a train controlling system, an electro-magnet, a commutator actuated thereby, a cylinder fixed above said commutator, a piston in said cylinder, a stem attached to said piston and projecting through the bottom of said cylinder, the end of said stem resting upon but not connected to the top of said commutator, a spring acting by compression on said piston, and means for regulating the degree of compression of said spring.

15. In a train controlling system, an electro-magnet, a commutator actuated thereby, a cylinder fixed above said commutator, a piston in said cylinder, a stem attached to said piston and projecting through the bottom of said cylinder, the end of said stem resting upon but not connected to the top of said commutator, a spring acting by compression on said piston, a second piston arranged in said cylinder above said spring, and a stem for the last mentioned piston threaded to and projecting through the top of said cylinder for regulating the degree of compression of said spring.

16. In a train controlling system, a track switch, mechanism for locking the same in closed position from a point in the block preceding that in which the switch is located, mechanism associated with said switch for unlocking the same from a point in the block in which the switch is located, and means comprising a source of electrical energy carried by the train for actuating the locking mechanism when the train is in the block preceding the switch and for actuating the unlocking mechanism when the train is in the block in which the switch is located.

17. In a train controlling system, the combination with an electrically-continuous rail and a sectional rail, each section of which is divided into two insulated portions and is insulated from its contiguous sections, a track switch in the advance portion of one of said sections, a magnet for locking said switch in closed position, a conductor connecting said continuous rail with said advance portion of said section, a commutator actuated by said magnet for making and breaking said conductor and means comprising a source of electrical energy carried by the train for energizing said magnet.

18. In a train controlling system, the combination with an electrically-continuous rail and a sectional rail, each section of which is divided into two insulated portions and is insulated from its contiguous sections, a track switch in the advance portion of one of said sections, a magnet for locking said switch in closed position, a conductor connecting one terminal of said magnet to the rear portion of said section, a commutator actuated by said magnet for making and breaking said conductor, a conductor connecting the other terminal of said magnet to said continuous rail, and means comprising a source of electrical energy carried by the train for energizing said magnet.

19. In a train controlling system, the combination with an electrically-continuous rail and a sectional rail, each section of which is divided into two insulated portions and is insulated from its contiguous sections, a track switch in the advance portion of one of said sections, a magnet for locking said switch in closed position, a magnet for unlocking said switch, a ramp located near said switch, a shoe carried by the train for coöperating with said ramp, a conductor connecting one terminal of said unlocking magnet with said ramp, a commutator actuated by said unlocking magnet for making and breaking said conductor, a conductor connecting the other terminal of said magnet with said continuous rail and means comprising a source of electrical energy carried by the train for energizing both of said magnets.

20. In a train controlling system, the combination with an electrically-continuous rail and a sectional rail, each section of which is divided into two insulated portions and is insulated from its contiguous sections, a track switch in the advance portion of one of said sections, means for locking said switch in closed position, a conductor for putting a short circuit across said continuous rail and the advance portion of said sectional rail, and a commutator actuated by said means for breaking said short circuit when said switch is locked in closed position and means comprising a source of electrical energy carried by the train for actuating said means.

21. In a train controlling system, the combination with an electrically-continuous rail and a sectional rail, each section of which is divided into two insulated portions and is insulated from its contiguous sections, a track switch in the advance portion of one of said sections, a magnet for locking said switch, and means including a source of electrical energy carried by the train for actuating said magnet when said train is in the block preceding that in which the switch is located.

22. In a train controlling system, the combination with an electrically-continuous rail and a sectional rail, each section of which is divided into two insulated portions and is insulated from its contiguous sections, a track switch in the advance portion of one of said sections, a magnet for locking said switch in closed position, a track magnet associated with the end of the block in which said switch is located, a train-stopping magnet carried by the train, a control magnet for governing the circuit of said train-stopping magnet, means actuated by said track magnet for controlling the circuit of said control magnet, and means actuated by the switch-locking magnet for controlling the action of said track magnet.

23. In a train controlling system, a track switch, a switch rod for opening and closing the same, a locking member arranged to coöperate with said switch rod, a double solenoid, a plunger therefor, said locking member being carried by said plunger, a commutator actuated by said plunger, and means whereby the circuits of said double solenoid are controlled by said commutator.

In testimony whereof, we have hereunto subscribed our names.

ELMER N. HUTCHINS,
EDWARD E. EAMES,

*Administrators with will annexed of the estate not already administered of Edward L. Orcutt, deceased, testate.*